United States Patent [19]

Brown et al.

[11] Patent Number: 5,125,255

[45] Date of Patent: Jun. 30, 1992

[54] METHOD OF MAKING AN ELECTROMAGNETIC COUPLING DISC

[75] Inventors: Joseph H. Brown, Davis; Lowell S. Burruss, Roscoe, both of Ill.

[73] Assignee: Dana Corporation, Toledo, Ohio

[21] Appl. No.: 721,972

[22] Filed: Jun. 27, 1991

[51] Int. Cl.5 .................... B21D 53/00; B21D 28/32
[52] U.S. Cl. ............................. 72/334; 72/340; 29/602.1; 29/163.6
[58] Field of Search .................. 72/334, 333, 327, 340, 72/352, 415; 29/163.6, 602.1, 890.1, 890.142, 890.143

[56] References Cited

U.S. PATENT DOCUMENTS

| | | | |
|---|---|---|---|
| 2,669,769 | 2/1954 | Peterson | 29/163.6 |
| 3,566,513 | 3/1971 | Fuller | 29/163.6 |
| 4,818,840 | 4/1989 | Booth | 29/607 |
| 4,951,797 | 8/1990 | Booth | 192/107 R |

FOREIGN PATENT DOCUMENTS

| | | | |
|---|---|---|---|
| 4776 | 11/1923 | Fed. Rep. of Germany | 29/163.6 |
| 515678 | 3/1957 | Italy | 29/890.142 |
| 106741 | 8/1980 | Japan | 29/163.6 |
| 922455 | 4/1963 | United Kingdom | 29/890.142 |

Primary Examiner—Daniel C. Crane
Attorney, Agent, or Firm—Leydig, Voit & Mayer, Ltd.

[57] ABSTRACT

A coupling disc (i.e., the armature or rotor) of an electromagnetic coupling is made by using a punch and die to emboss a plurality of radially spaced rows of angularly spaced grooves in the non-working face of the disc and to cause a plurality of radially spaced rows of angularly spaced projections to be displaced from the working face of the disc. The working face then is machined to remove the projections and, as an incident thereto, circumferentially continuous grooves are formed in the working face in radial alignment with the grooves in the non-working face in order to leave thin webs which establish magnetic flux barriers. To establish even better flux barriers, angularly spaced slots of narrow radial width may be formed through the disc by piercing the disc from the working face thereof and breaking through the thin webs located between the sets of grooves.

5 Claims, 3 Drawing Sheets

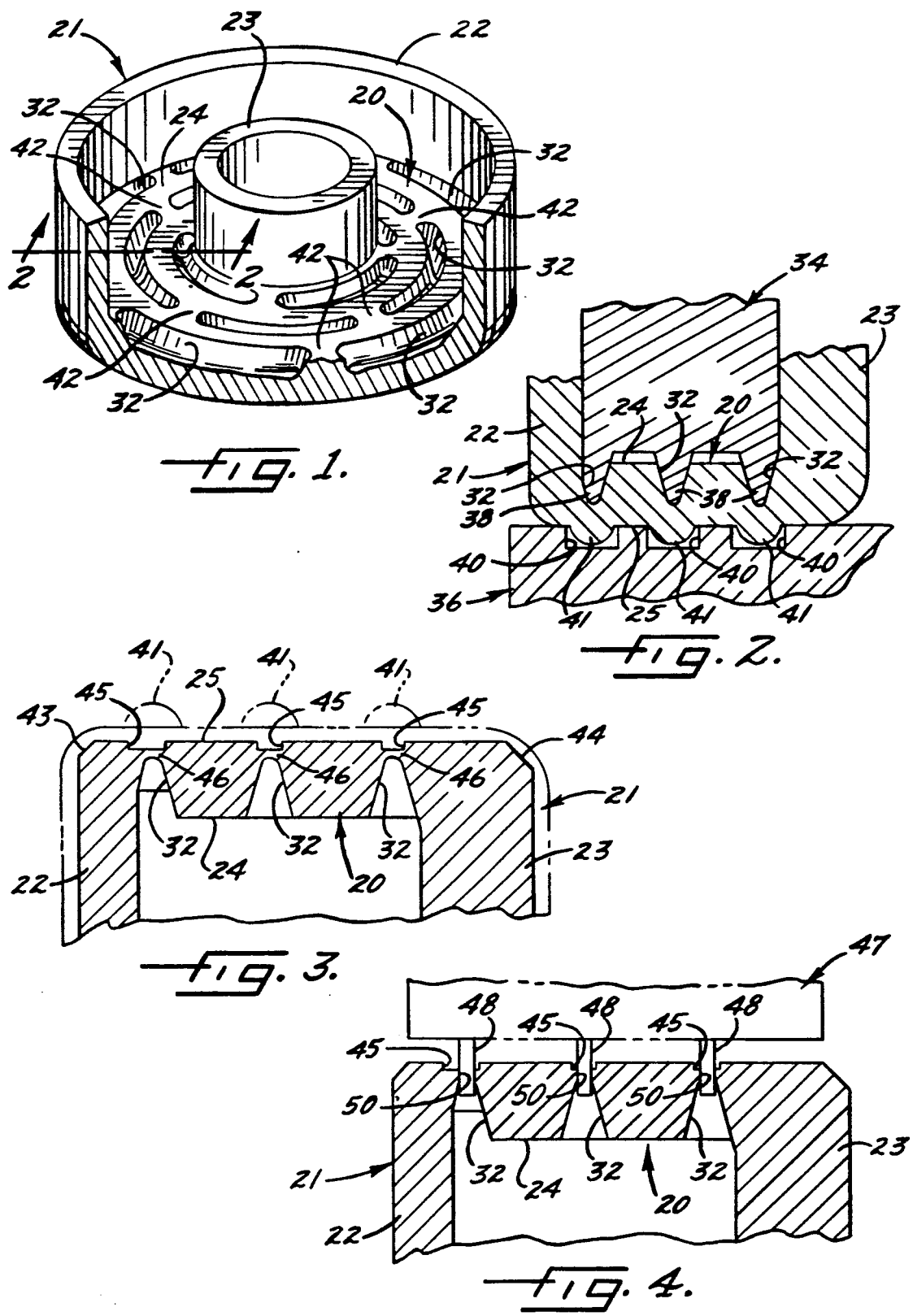

METHOD OF MAKING AN ELECTROMAGNETIC COUPLING DISC

BACKGROUND OF THE INVENTION

This invention relates to multiple pole coupling discs of the type used in an electromagnetic coupling such as an electromagnetic clutch or brake. The coupling disc may be part of a rotary or non-rotary field or may be a rotary or non-rotary armature.

A typical electromagnetic coupling is disclosed in Silvestrini et al U.S. Pat. No. 4,187,939 and, in that particular case, the coupling is an electromagnetic clutch having a rotary armature disc made of low reluctance material such as steel and having a field with a rotary coupling disc or rotor which also is made of low reluctance material. When the coil of the field is excited, magnetic flux threads a path between the rotor and the axially opposing armature and attracts the armature into engagement with the working face of the rotor to couple the two for rotation in unison.

In the coupling disclosed in the Silvestrini et al patent, the armature is formed with a ring of angularly spaced "banana" slots while the rotor is formed with two concentric rings of angularly spaced banana slots located on opposite sides of the ring of slots in the armature. The banana slots form high reluctance air gaps causing the rotor and armature to define four magnetic poles which increase the torque of a coupling having a coil of a given diameter. By forming an additional ring of slots in each of the rotor and armature, the coupling may be constructed as a six-pole coupling with even higher torque capacity.

Until just recently, the banana slots conventionally have been stamped in the rotor and armature. Presently available stamping techniques dictate that, as a general rule, the radial width of the slots cannot be substantially less than approximately ¾ the thickness of the disc. As a result, difficulty is encountered in stamping multiple rings of slots in a comparatively thick disc which is relatively small in diameter. In addition, stamping of the slots leaves burrs at the edges of the slots and tends to impose restrictions on the location of the slots in the disc and on the shape of the slots. It is difficult to maintain concentricity between adjacent rows of slots and it is difficult to keep all portions of the disc of a uniform thickness. The design of the disc thus tends to be dictated by tooling considerations rather than magnetic characteristics.

A significant improvement in electromagnetic coupling discs is disclosed in Booth et al U.S. Pat. No. 4,951,797. In the coupling disc of that patent, the magnetic poles are delineated by closed-end grooves in the non-working face of the disc rather than by through slots so as to avoid the manufacturing difficulties which arise in the formation of slots by stamping or by other techniques such as laser cutting. To form the grooves in the disc of the Booth et al patent, the material of the disc is displaced by a metal rolling method which requires a rotating die for supporting the disc and also requires a traversing roller for pressing the disc against the die. Tooling of this type is rather complex and specialized and is not compatible with conventional manufacturing techniques which assimilate stamping.

SUMMARY OF THE INVENTION

The general aim of the present invention is to provide a simplified method of manufacturing an electromagnetic coupling disc having a plurality of radially spaced rows of angularly spaced grooves formed in its non-working face, the method being somewhat analogous to stamping in that it utilizes a stationary die and a reciprocating punch.

A more detailed object of the invention is to achieve the foregoing through the provision of a method in which a reciprocating punch having a plurality of circular and radially spaced rows of arcuate and angularly spaced ribs is impacted against the non-working face of the disc and displaces metal from the working face into a plurality of circular and radially spaced rows of arcuate and angularly spaced grooves formed in a stationary die which underlies and supports the working face during the punching operation. In this way, a plurality of circular and radially spaced rows of arcuate and angularly spaced grooves is embossed in the non-working face of the disc while corresponding projections are formed on the working face and are received in the grooves in the die. Subsequently, the projections are machined off of the working face so as to leave that face substantially flat and planar. As an incident to removing the projections, concentric rows of grooves may be machined in the working face in radial alignment with the grooves in the non-working face so as to reduce further the thickness of the disc in the area of the grooves and thereby effect better delineation of the magnetic poles.

A further object is to take advantage of the reduced thickness of the disc in the area of the grooves to enable angularly spaced and substantially burr-free slots of extremely narrow radial width to be formed quickly and easily through the disc so as to establish flux barriers of even higher reluctance between adjacent poles.

These and other objects and advantages of the invention will become more apparent from the following detailed description when taken in conjunction with the accompanying drawings.

BRIEF DESCRIPTION OF THE DRAWINGS

FIG. 1 is a perspective view showing an electromagnetic coupling disc made by a new and improved method incorporating the unique features of the present invention.

FIG. 2 is an enlarged fragmentary cross-section taken substantially along the line 2—2 of FIG. 1 and schematically shows the first step of the method of the invention.

FIGS. 3 and 4 are views generally similar to FIG. 2 but schematically show two successive steps of the method.

DETAILED DESCRIPTION OF THE PREFERRED EMBODIMENT

Figure 5:
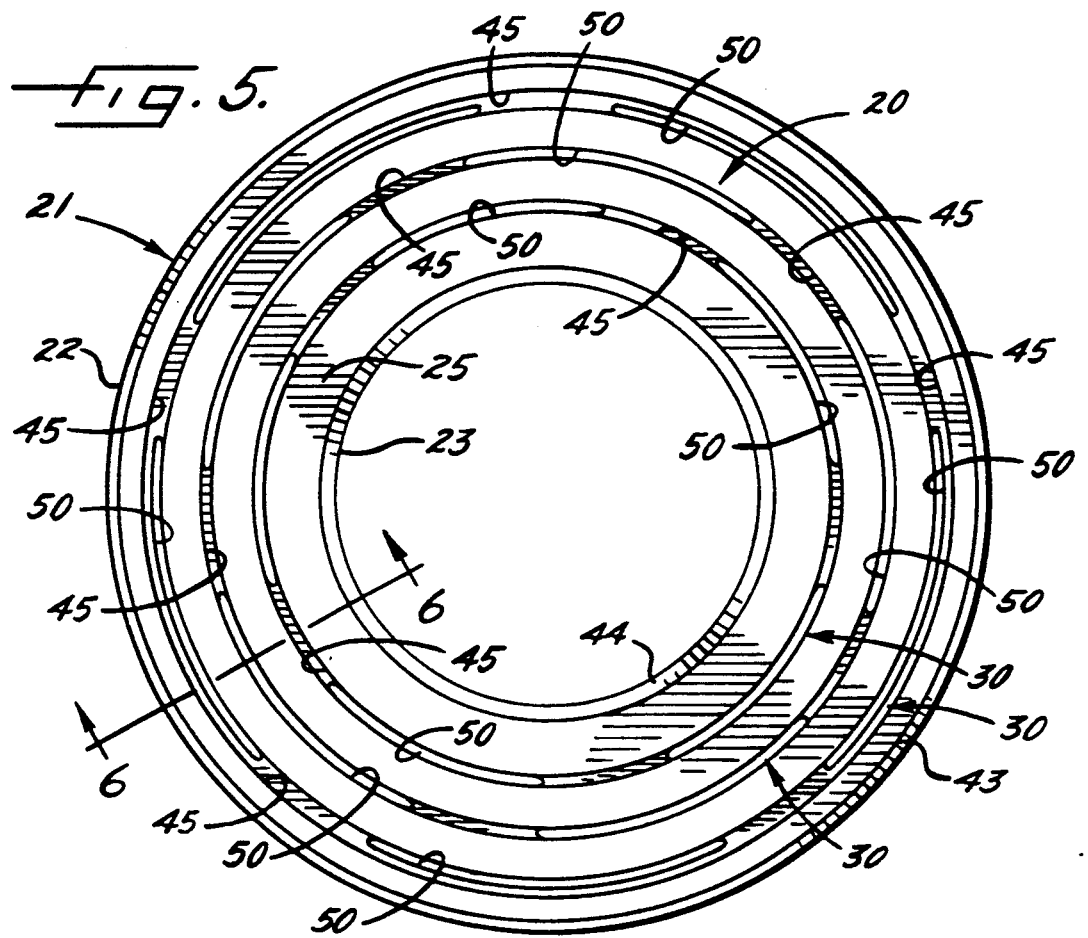
FIG. 5 is an enlarged plan view showing the working face of the coupling disc.
Figure 6:
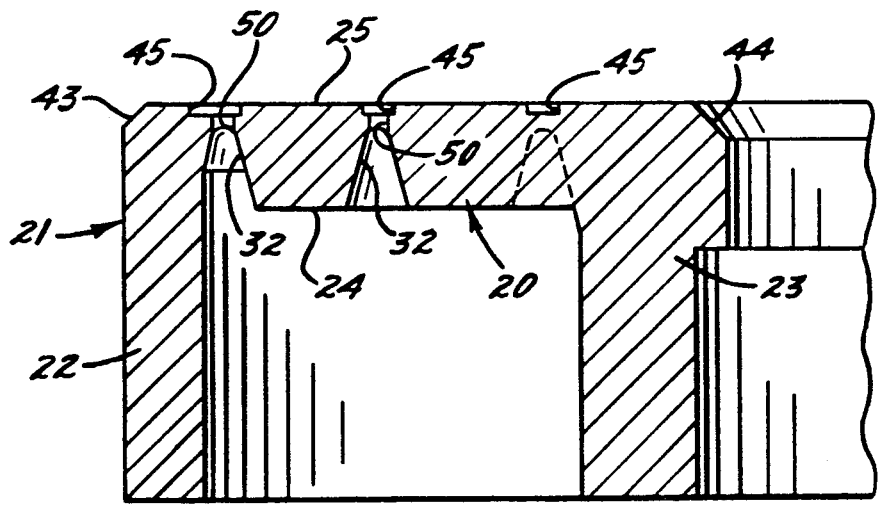
FIG. 6 is an enlarged fragmentary cross-section taken substantially along the line 6—6 of FIG. 5.

The drawings illustrate the present invention in connection with a coupling disc 20 for use in an electromagnetic coupling such as an electromagnetic brake or clutch. While the disc could be an armature, it herein is shown as forming part of a clutch rotor 21 which may, for example, be of the type disclosed in the aforementioned Silvestrini et al patent. In this particular instance, the rotor is circular in shape and includes an axially extending outer flange 22 and an axially extending inner hub 23 which preferably are integral with one face 24 of the disc 20. The opposite face 25 (FIG. 4) of the disc forms the working face of the rotor 21 and is adapted to frictionally engage the armature of the clutch. The flange 22 and the hub 23 define the outer and inner pole rings, respectively, of the rotor 21.

As is conventional, the rotor 21 is made of low reluctance magnetic material such as steel. While the rotor could be cast and then machined, it preferably is formed by a stamping and forming operation.

The specific rotor 21 which has been illustrated forms part of a six-pole clutch and thus the disc 20 includes three concentric rings 30 (FIG. 5) which carry less magnetic flux than the remaining areas of the disc. One magnetic pole is defined by that annular area of the disc located radially inwardly of the inner ring, two poles are defined by the annular area between the inner ring and the middle ring, two additional poles are defined by the annular area between the middle ring and the outer ring, and the sixth pole is defined by the annular area located outwardly of the outer ring.

The high reluctance rings 30 are defined at least in part by grooves 32 which, in accordance with the invention, are embossed in the non-working face 24 of the disc 20 by stamping the non-working face with a reciprocating embossing punch 34 adapted to coact with a stationary die 36 that backs the working face 25 of the disc and receives the metal displaced therefrom by the punch. By forming the grooves 32 through the use of the punch 34 and die 36, the grooves may be formed in a simpler manner and with more conventional equipment than has been the case with prior grooved coupling discs.

Figure 7:
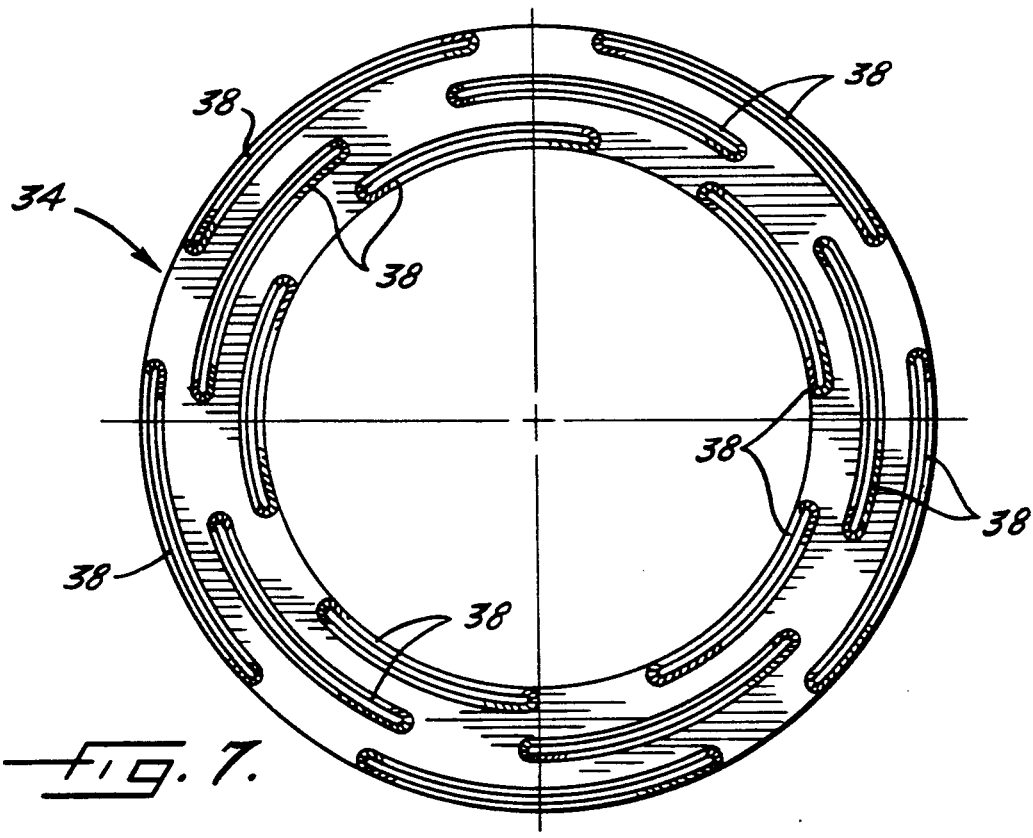
FIGS. 7 and 8 are enlarged end views of the punch and die, respectively, shown in FIG. 2.

More specifically, the punch 34 is annular in shape and its working end is formed with three radially spaced and generally circular rows of angularly spaced and generally arcuate ribs 38 (FIGS. 2 and 7) which project axially from the working end of the punch. The ribs are generally V-shaped in axial cross-section.

Figure 8:
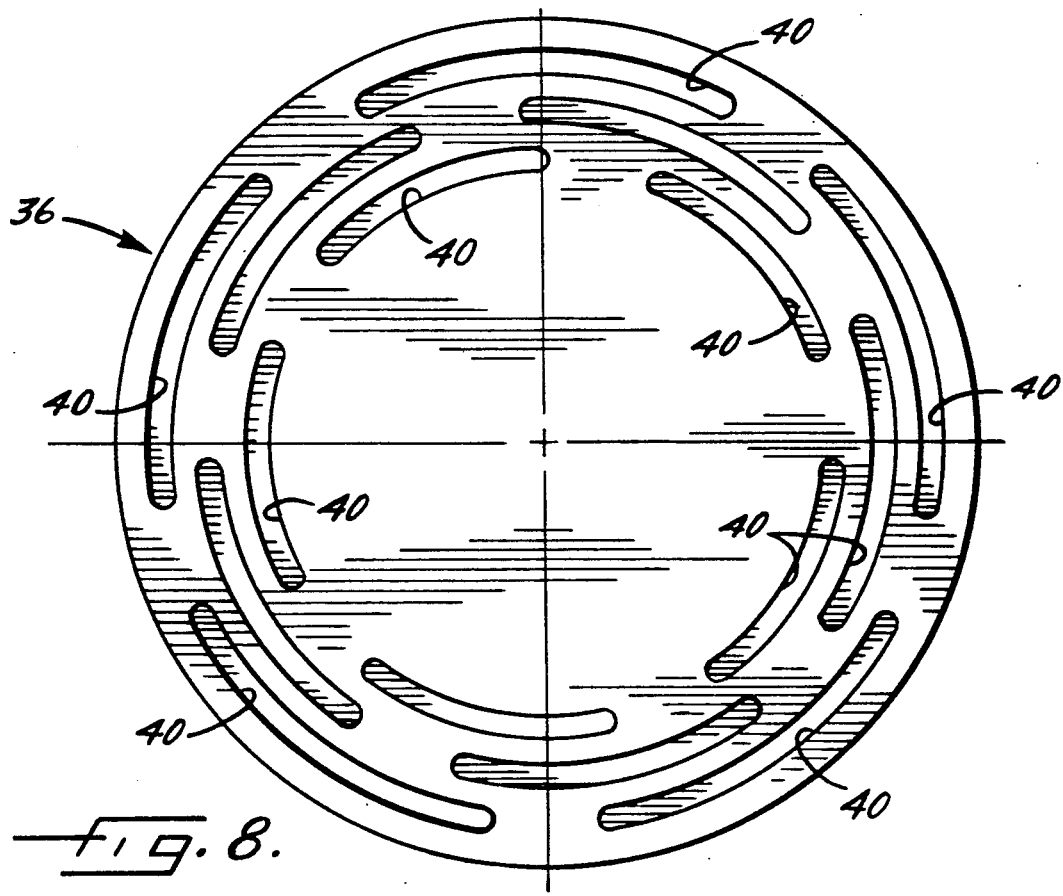

The die 36 is complementary to the punch 34 and its upper surface is formed with three radially spaced and generally circular rows of arcuate grooves 40 (FIGS. 2 and 8), the grooves 40 of each row preferably being spaced angularly from one another. The grooves 40 of the die 36 are aligned radially and angularly with the ribs 38 of the punch 34.

The first step in the method of forming the high reluctance rings 30 in the coupling disc 20 involves placing the working face 25 of the disc against the upper surface of the die 36 as shown in FIG. 2. Thereafter, the punch 34 is shifted downwardly and is impacted against the non-working face 24 of the disc 20 with such force as to cause the ribs 38 to displace the metal of the disc downwardly and thereby emboss three radially spaced and generally circular rows of arcuate and angularly spaced grooves 32 in the non-working face. The metal displaced by the ribs 38 flows axially outwardly from the working face 25 of the disc and forms three radially spaced and generally circular rows of arcuate and angularly spaced projections 41 (FIG. 2) which are received and confined by the grooves 40 of the die 36. Thus the punch 34 embosses concentric rows of angularly spaced grooves 32 in the non-working face 24 of the disc 20 and coacts with the die 36 to cause concentric rows of angularly spaced projections 41 to protrude from the working face 25 of the disc. Because the grooves 32 of each row are spaced angularly from one another, adjacent grooves are separated from each other by bridges 42 (FIG. 1) which have a thickness approximately equal to the original thickness of the disc 20.

After the grooves 32 and the projections 41 have been formed by the punch 34 and the die 36, the working face 25 of the disc 20 is machined (e.g., by a cutter or a grinder) to remove the projections from the working face and to cause the working face to be formed as a substantially flat and planar friction surface (see FIG. 3). As part of the machining operation, chamfers 43 and 44 are formed at the outer and inner peripheries, respectively, of the working face adjacent the flange 22 and the hub 23. The cylindrical surfaces of the flange and the hub also may be machined to remove material therefrom and establish concentricity.

Preferably, shallow and circumferentially continuous annular grooves 45 (FIG. 3) are cut in the working face 25 of the disc 20 as an incident to removing the projections 41 or in a subsequent machining operation. The grooves 45 in the working face 25 are aligned radially with the grooves 32 in the non-working face 24 and, by virtue of the grooves 45, only relatively thin webs 46 of material are left between the working face 25 and the non-working face 24 in the region of the grooves 32. As a result of the webs 46 being thin, they are resistant to the flow of magnetic flux and thus serve to establish flux barriers between the magnetic poles of the disc 20. Even though the webs are thin, the disc possesses structural integrity by virtue of the bridges 42 between the grooves 32.

While the disc 20 as described thus far will function satisfactorily in many magnetic couplings, the invention further contemplates slotting the disc in the regions of the grooves 32 and 45 to further reduce the flux-carrying capability of the rings 30 and enable the rotor 21 to be used to produce higher torque. For this purpose, provision is made of a piercing tool 47 (FIG. 4) having three generally circular and radially spaced rows of generally arcuate and angularly spaced piercing elements 48. The piercing elements are generally "banana" shaped and having a radial width just slightly less than the radial width of the grooves 45 in the working face 25 of the disc 20.

When the piercing tool 47 is used, it is oriented such that its piercing elements 48 are aligned radially and angularly with the grooves 32 in the non-working face 24 of the disc 20. The tool then is moved toward the working face 25 to cause the piercing elements to break through the webs 46 at the bottoms of the grooves 45 and thereby form angularly spaced "banana" slots 50 through the disc. Because the webs 46 are very thin in the axial direction, the slots 50 may be of relatively narrow radial width (e.g., on the order of 0.035") and their edges are virtually free of burrs. Very little force is required to break through the webs and form the slots.

From the foregoing, it will be apparent that the present invention makes advantageous use of a punch 34 and a die 36 to emboss the non-working face 24 of a rotor disc 20 and form radially spaced rows of angularly spaced grooves 32 in the non-working face. By machining grooves 45 in the working face 25, the webs 46 are made thin so as to have only relatively low flux-carrying capability. The thin webs 46 defined between the grooves 32 and 45 enable substantially burr-free slots 50 of narrow radial width to be formed in the disc 20 simply by piercing through the webs from the working face 25 of the disc with the piercing tool 47.

We claim:

1. A method of forming a multiple pole coupling disc for an electromagnetic coupling, said method comprising the steps of, providing a generally circular disc made of metal and having a first side which defines the working face of the coupling disc and having a second and oppositely facing side which defines the non-working face of the coupling disc, placing the first side of the disc against a die having a plurality of radially spaced rows of grooves, axially impacting the second side of the disc with a punch having a plurality of radially spaced rows of angularly spaced ribs, the ribs of said punch being aligned radially with the grooves of said die, said punch being impacted against the second side of the disc through a stroke of predetermined length and with such force as to cause said ribs to displace metal toward said die and to form a plurality of radially spaced rows of angularly spaced grooves in the second side of said disc, the length of said stroke being such that the grooves in the second side of said disc stop short of the first side of the disc thereby to leave the first side of the disc in an unbroken condition, the metal displaced by said ribs being forced axially away from the first side of said disc and forming a plurality of radially spaced rows of angularly spaced projections which are received in the grooves in said die, machining the first side of said disc to remove said projections therefrom and to make said first side substantially flat while leaving said first side in said unbroken condition, machining a plurality of radially spaced rows of annular grooves in the first side of said disc, the grooves in the first side of the disc being aligned radially with the grooves in the second side of the disc, and piercing through said disc from the first side thereof and at radially and angularly spaced locations aligned radially and angularly with the grooves in the second side of the disc thereby to form radially spaced rows of angularly spaced slots through said disc.

2. A method as defined in claim 1 in which said piercing is effected after machining of said annular grooves in the first side of said disc.

3. A method as defined in claim 1 in which said piercing is effected by a piercing tool having radially spaced rows of angularly spaced piercing elements located to engage and punch through the bottoms of the annular grooves in the first side of said disc, the radial width of said piercing elements being less than the radial width of the annular grooves in the first side of the disc.

4. A method of forming a multiple pole coupling disc for an electromagnetic coupling, said method comprising the steps of, providing a generally circular disc made of a metal having low magnetic reluctance, said disc having a first side which defines a working face and having a second and oppositely facing side which defines a non-working face, placing the working face of the disc against a die having a plurality of circular and radially spaced rows of arcuate and angularly spaced grooves, impacting the non-working face of the disc with an axially movable punch having a plurality of circular and radially spaced rows of arcuate and angularly spaced ribs, the ribs of said punch being aligned radially and angularly with the grooves of said die, said punch being impacted against the non-working face of the disc through a stroke of predetermined length and with such force as to cause said ribs to displace the metal of said disc toward said die and to form a plurality of circular and radially spaced rows of arcuate and angularly spaced grooves in the non-working face of the disc, the length of said stroke being such that the grooves in the non-working face of said disc stop short of the working face of the disc thereby to leave the working face in an unbroken condition, the metal displaced by said ribs being forced axially away from the working face of said disc and forming a plurality of circular and radially spaced rows of arcuate and angularly spaced projections which are received in the grooves in said die, machining the working face of said disc to remove said projections therefrom, while leaving said working face in an unbroken condition, subsequently machining a plurality of circular rows of circumferentially continuous grooves in the working face of said disc in radial alignment with the rows of grooves in the non-working face of said disc, and piercing through said disc from the working face thereof and at radially and angularly spaced locations aligned radially and angularly with the grooves in the non-working face of the disc thereby to form circular and radially spaced rows of angularly spaced slots through said disc.

5. A method as defined in claim 4 in which said piercing is effected by a piercing tool having a plurality of circular and radially spaced rows of arcuate and angularly spaced piercing elements located to engage and punch through the bottoms of the grooves in the working face of said disc, the radial width of said punching elements being less than the radial width of the grooves in the working face of said disc.

* * * * *